Oct. 7, 1969  OLE-BENDT RASMUSSEN  3,471,353
METHOD OF UNITING PLIES OF AN ORIENTED SHEET MATERIAL
Filed Jan. 27, 1965
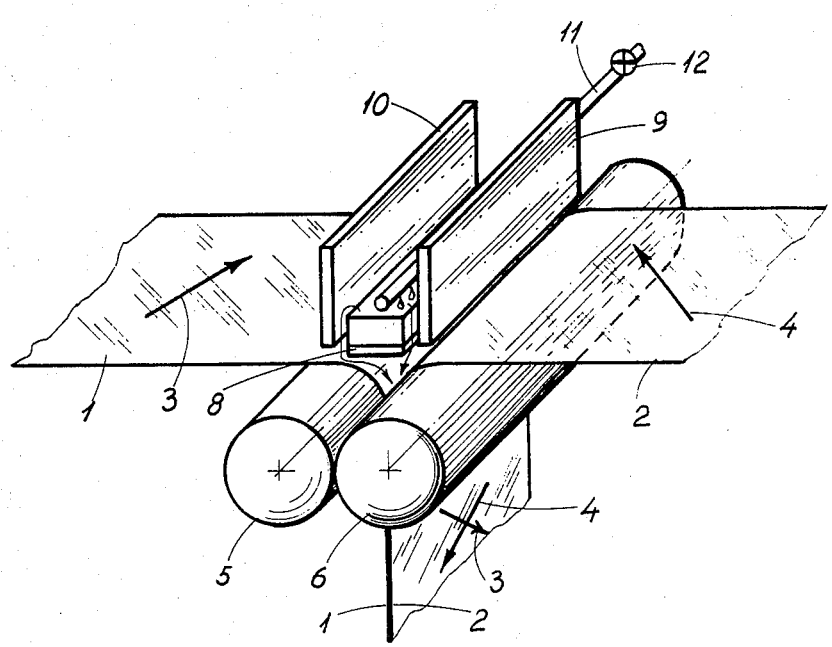
INVENTOR
OLE-BENDT RASMUSSEN
BY Sol Shappirio
ATTORNEY United States Patent Office 3,471,353
Patented Oct. 7, 1969

3,471,353
METHOD OF UNITING PLIES OF AN
ORIENTED SHEET MATERIAL
Ole-Bendt Rasmussen, 14 Gyvelbakken,
Birkerod, Denmark
Filed Jan. 27, 1965, Ser. No. 428,509
Claims priority, application Great Britain, Jan. 28, 1964,
3,637/64
Int. Cl. C09j 5/02
U.S. Cl. 156—308                    3 Claims

ABSTRACT OF THE DISCLOSURE

In producing a laminate from plies of oriented thin, flexible sheet material, particularly polyolefine films, the plies to be united are heated to a temperature well below the melting range of the sheet material, vapours of a solvent for the said material being condensed on at least one of the surfaces of a pair of sheets to be united, and in an amount sufficient for bringing a thin surface layer of the material in a swelled to dissolved state.

---

The present invention relates to an improved method of uniting plies of an oriented thin and flexible polymer material in the form of sheets or films, the uniting being carried out either on part of the surfaces to form a seam or over the total surface to form a laminate.

The uniting of polymers in the form of sheets or films has hitherto been carried out by welding or by means of an adhesive.

In the common heat welding, high-frequency welding, and ultrasonic welding, however, the material undergoes some deformation in the areas where the welding takes place, and loses strength in adjacent areas. In the case of oriented films, the partial melting of the material, which is subjected to heat welding, further results in loss of the orientation and, accordingly, weakening of the material.

Heat welding and ultrasonic welding are also disadvantageous in that the welding can be performed only at moderate speed.

High-frequency welding can be used only in materials having a sufficiently high dielectricity constant.

Adhesive uniting is well suited for some materials, whereas others, for example polyolefines, are very difficult to unite adhesively.

It is the object of the present nivention to provide a method of uniting, which is applicable to all kinds of polymer material in the form of thin and flexible sheets or films.

With this object in view, the uniting is carried out, according to the present method, by applying, at increased temperature but well below the melting range of the sheet material, a constantly maintained supply of solvent for the sheet material to at least one of the surfaces to be united, the solvent being applied immediately before said surfaces contact one another, and in an amount sufficient only for bringing a thin surface layer of the sheet material in a swelled to dissolved state without any substantial absorption taking place in the remainder of the sheet material.

Since only a thin surface layer is involved, the uniting takes place speedily, and the orientation is not influenced by the uniting.

In one embodiment of the present method, the plies consist of uniaxially oriented polymer films, and the uniting is carried out over the total surface, and so that the directions of orientation of the individual plies form an angle with one another. This results in the kind of laminate called cross plastic, and the present method permits manufacturing this kind of products in a speedy and efficient manner.

As formerly mentioned, the present method is applicable to all kinds of polymer material, and in a preferred embodiment, the oriented sheet material is a polyolefine material. This is particularly advantageous, since the use of crystalline polyolefine films for packing purposes is ever increasing, and on the other hand polyolefine material is very difficult to unite in any hitherto known manner without deformation or loss of orientation.

The solvent to be applied in the present method should preferably have a boiling point at least so high to allow for a reasonable solubility of the polymer material at the boiling point of the solvent, and at present the preferred solvent is toluene or xylene, both of which are cheap and of excellent dissolving properties also as regards the polyolefine films in current use.

The action of the solvent should be of short duration so that only a thin surface layer of the polymer material is affected, and for this purpose heating of the polymer material, or the solvent, or both the polymer material and the solvent is appropriate. In an embodiment of the present method, therefore, the solvent is applied in vapour form, the vapours being condensed at the site of application. The hot vapours, and the heat which is released by this condensation, make for a speedy action upon the surfaces to be united, and use of the solvent in vapour form makes it easy to regulate the amount of applied solvent.

If desired, the action of the solvent can be limited to confined areas so that, for example, the uniting takes place in the form of seams, or a spotwise uniting is accomplished if, according to the invention, parts of the surfaces to be united are covered with a protecting layer of a substance which is insoluble in and impervious to the applied solvent.

In one manner of carrying out the present method, two polyolefine films to be united are carried one over each of a pair of metal rollers mounted side by side in a horizontal position. The rollers are internally heated to a temperature of about 100° C., and the films are carried downwards through the nip of the rollers, at a speed of for example 1 cm. per second, said nip forming a trough for a small supply of xylene, which is constantly maintained. The xylene dissolves a thin surface layer, and the solution acts as an adhesive, uniting the two films.

In a preferred embodiment of the present method, however, the solvent is applied in vapour form under conditions resulting in a condensation of the vapours.

The films are again united by means of a pair of rollers which may be provided with internal heating means, allowing for some pre-heating of the films. The solvent, preferably toluene or xylene, is applied in vapour form in the nip, a condensation taking place by which heat is liberated. By suitably adjusting the temperature of the rollers and the speed of the films, a thin surface layer of the latter is dissolved, the solution serving as an adhesive to unite the layers.

Depending on the manner of applying the solvent vapours, in overall, seamlike or spotwise uniting is secured.

Only small amounts of solvent are consumed in the present method. Thus, 5 grams of solvent per square meter of film will be sufficient to form a strong, almost unbreakable connection between films of a thickness of 30µ or more.

Applying the present method to usual polymer films produced by extruding or casting has the advantage that the speed of uniting the layers can be greatly increased in comparison with the hitherto known methods, and that the method can be used for any type of polymer films.

Particularly in the case of polyolefine films, a great uniting or laminating speed is possible when using vapours, owing to the liberation of heat which takes place through the condensation of the solvent.

In using oriented films, the further advantage is gained that the orientation is not disturbed and no deformation of the surface of the resulting laminate occurs.

The latter advantage is of particular importance for the type of laminate called cross-plastics, i.e. a laminate consisting of unidirectionally oriented films, for example polyethylene films and polypropylene films, in which the directions of orientation are different in the different layers, because such laminates are apt to fold when subjected to influences causing shrinkage, which manifests itself almost exclusively in the stretching or orienting direction.

In the following, an example of applying the present method to the production of a cross plastic laminate will be described with reference to the accompanying drawing, showing diagrammatically means for carrying out the lamination.

Two films 1 and 2 to be laminated have a thickness of 30μ, and were made from polyethylene with a density of 0.96 and a melting index of 0.2, to which 10% by weight of polyisobutylene had been added.

As indicated by arrows 3 and 4, the films were oriented at 45° to the longitudinal direction, the directions of orientation forming an angle with one another of 90° in the resulting laminate.

For uniting, the films are supplied one from each side to a pair of rollers 5 and 6 with means for internal heating, the temperature of the rollers being kept within the range of 90 to 110° C.

Over the nip of the rollers, means for supplying xylene in vapour form are positioned, comprising a trough with a double bottom 8 with means for heating, as for example with steam. Further means for heating the space around the trough consist of two heat radiators 9 and 10 which are placed parallel to the trough on either side. The xylene is supplied through a tube 11 with a regulating valve 12, said tube 11 being mounted over the trough and provided with perforations through which the xylene drips into the trough, where it is evaporated by the contact with the heated bottom 8. The vapours, being substantially heavier than the surrounding atmosphere, pass over the borders of the trough down in the nip between the rollers 5 and 6 and condensate on the films 1 and 2 to be united in the nip. After having passed the lamination rollers, the laminate was carried through another pair of rollers, where cooling and pressure were applied to complete the lamination.

The best results are obtained by keeping the temperature of the rollers below the temperature at which shrinking of the films occurs, but on the other hand as near the said temperature as possible. If the heating of the films is insufficient, the solvent remains in a surface layer and forms a brittle, gel-like layer; whereas by sufficient heating the solvent will eventually be distributed throughout the film material after having performed its duty in the lamination process.

Other modifications of the present method are possible for example to apply xylene to the surfaces of two polyethylene films at room temperature, placing the two films with the xylene-treated surfaces against one another and passing the united films over a heated surface, afterwards cooling and pressing to complete the lamination.

Moreover, the present method can be applied to networks of fibres, which are produced by subjecting the oriented films to a splitting treatment, to form a nonwoven textile product.

I claim:

1. In the method of producing a laminate from plies of oriented, thin, flexible sheet material of polyolefin films which comprises heating the plies to be united to a temperature below the melting range of said sheet material, condensing vapors of a solvent for said sheet material on at least one of the surfaces of a pair of sheets to be united, and in an amount sufficient for bringing a thin surface layer of the sheet material in a swelled to dissolved state, said uniting being carried out with films having directions of orientation which form an angle with one another.

2. The method of claim 1, in which the solvent is a member of the group consisting of toluene and xylene.

3. The method of claim 1, in which parts of the surfaces to be united are covered with a protecting layer of a substance which is insoluble in and impervious to the applied solvent.

References Cited

UNITED STATES PATENTS

| | | | |
|---|---|---|---|
| 2,590,557 | 3/1952 | Melsheimer | 117—48 |
| 2,983,639 | 5/1961 | Jageman | 156—307 X |
| 3,201,302 | 8/1965 | Williams et al. | 156—307 X |
| 3,278,354 | 10/1966 | Wennin | 156—307 X |
| 3,296,046 | 1/1967 | Pouncy | 156—82 |
| 3,322,613 | 5/1967 | Rasmussen | 161—252 X |
| 3,342,657 | 9/1967 | Dyer | 156—229 X |
| 3,322,593 | 5/1967 | Conti | 156—322 X |

HAROLD ANSHER, Primary Examiner

R. A. KILLWORTH, Assistant Examiner

U.S. Cl. X.R.

156—322; 161—55, 402